United States Patent [19]
Nagae et al.

[11] Patent Number: 5,996,347
[45] Date of Patent: Dec. 7, 1999

[54] VARIABLE-NOZZLE TYPE TURBO CHARGER

[75] Inventors: Masahiro Nagae; Kouichi Akita, both of Susono; Hisashi Ohki, Numazu, all of Japan

[73] Assignee: Toyota Jidosha Kabushiki Kaisha, Toyota, Japan

[21] Appl. No.: 08/903,382

[22] Filed: Jul. 30, 1997

[30] Foreign Application Priority Data

Aug. 6, 1996 [JP] Japan .................................. 8-207150

[51] Int. Cl.$^6$ .................................................. F02B 37/24
[52] U.S. Cl. ............................................................ 60/602
[58] Field of Search ........................................ 60/600–603

[56] References Cited

U.S. PATENT DOCUMENTS 4,235,076 11/1980 Meloche et al. ............................ 60/602
4,286,433 9/1981 Detweiler .................................. 60/602

FOREIGN PATENT DOCUMENTS

454943 11/1991 European Pat. Off. ................ 60/602
2483515 12/1981 France ..................................... 60/602
29 43 729 5/1981 Germany .
40 14 398 11/1991 Germany .
42 43 448 6/1994 Germany .
60-198334 10/1985 Japan ...................................... 60/602
U-62-137340 8/1997 Japan .
2 062 752 5/1981 United Kingdom .

*Primary Examiner*—Michael Koczo
*Attorney, Agent, or Firm*—Oliff & Berridge, PLC

[57] ABSTRACT

A variable-nozzle type turbo charger capable of temporarily decreasing the back pressure of the engine at the start of the engine. The turbo charger is equipped with a plurality of nozzle vanes of which the opening degree can be changed and are capable of changing the areas of turbine nozzles at the time when exhaust gases of an engine are guided from said turbine nozzles formed among said nozzle vanes to a turbine rotor, wherein an actuator that adjusts the opening degree of the nozzle vanes is so controlled that the areas of the turbine nozzles are larger than a minimum area for a predetermined period of time from the start of the engine, and, after the passage of said predetermined period of time, said actuator is so controlled that the areas of said turbine nozzles become the minimum area to promote the warming-up of the engine when the water temperature of the engine or the engine load is smaller than a predetermined value.

7 Claims, 14 Drawing Sheets

VARIABLE-NOZZLE TYPE TURBO CHARGER

BACKGROUND OF THE INVENTION

1. Field of the Invention

The present invention relates to a variable-nozzle type turbo charger equipped with a plurality of nozzle vanes of which the opening degree can be varied, and is capable of varying areas of turbine nozzles at the time when the exhaust gases of an engine are guided from the turbine nozzles formed among the nozzle vanes to a turbine rotor.

2. Description of the Related Art

Internal combustion engines for automobiles can be classified into normal aspiration type engines and supercharged type engines. In recent years, however, the ratio of the supercharged type engines is increasing. The supercharger mechanisms that have been put into practical use include the one of the type driven by an exhaust gas turbine which is generally called a turbo charger and the one of the type mechanically driven which is generally called a supercharger. In the turbo charger, the turbine is rotated by the energy of exhaust gases, and the intaken air is compressed by a compressor directly coupled to the turbine and is supplied to the engine. The turbo-charged engine is usually provided with a waste gate valve for by-passing part of the exhaust gases flowing into the turbine in order to prevent the supercharging pressure from excessively increasing.

When the engine is rotating at a low speed, the flow rate of the exhaust gases is so small that the supercharging by the turbo charger is not sufficient. To cope with this problem, there has been developed a turbo charger in which the areas of the turbine nozzles are decreased to increase the kinetic energy given to the turbine rotor. A variable-nozzle type turbo charger is just one of this type, in which provision is made of a plurality of nozzle vanes of which the opening degree can be changed, in order to vary the areas of the turbine nozzles at the time when exhaust gases of the engine are guided from the turbine nozzles formed among the nozzle vanes to the turbine rotor.

In this variable-nozzle type turbo charger, the opening degree of the nozzle vanes is controlled by using an actuator, and a variety of control methods have heretofore been proposed. For example, Japanese Unexamined Utility Model (Kokai) No. 62-137340 discloses technology according to which the opening degree of the nozzle vanes is minimized during the cold and light-load operation to minimize the areas of the turbine nozzles, in order to increase the pumping work of the engine and, hence, to quickly warm up the engine.

The above-mentioned technology is to quickly warm up the engine without, however, giving a thorough consideration from the start of cranking of the engine to the complete combustion, and there remains a likelihood that a defect may occur as mentioned below. That is, according to the above-mentioned prior art, the actuator is so controlled that the opening degree of the nozzle vanes becomes a minimum, i.e., the areas of the turbine nozzles become a minimum at the time of cold starting. At the start, the flow rate of exhaust gases is smaller than that of after the engine has been started and, hence, the pressure of the exhaust gases (back pressure of the engine) is low. Therefore, when the actuator is so controlled as to minimize the opening degree of the nozzle vanes at the start, the areas of the turbine nozzles become smaller than those of when the actuator is controlled after the engine has been started. As a result, exhaust gases are less exhausted, and the air is not introduced into the combustion chamber to a sufficient degree; i.e., an extremely rich state is established, complete combustion is not accomplished, and the engine is started with difficulty. The above-mentioned technology, therefore, is designed to be effected during the cold and light-load operation condition after the start of the engine causing, however, the back pressure of the engine to be excessively elevated at the time of start, i.e., at the time of cranking, which is not desirable.

SUMMARY OF THE INVENTION

In view of the above-mentioned circumstances, the object of the present invention is to provide a variable-nozzle type turbo charger equipped with control means capable of improving the starting performance of an engine.

In order to accomplish the above-mentioned object according to a first aspect of the present invention, there is provided a variable-nozzle type turbo charger equipped with a plurality of nozzle vanes of which the opening degree can be changed and are capable of changing the areas of turbine nozzles at the time when exhaust gases of an engine are guided from said turbine nozzles formed among said nozzle vanes to a turbine rotor, comprising:

an actuator for adjusting the opening degree of said nozzle vanes;

a first control means for controlling said actuator so that the areas of the turbine nozzles are larger than a minimum area for a predetermined period of time from the start of the engine; and a second control means for controlling said actuator so that the areas of said turbine nozzles become the minimum area to promote the warming-up of the engine when the water temperature of the engine or the engine load is smaller than a predetermined value after the passage of said predetermined period of time.

According to a second aspect of the present invention, furthermore, there is provided the variable-nozzle type turbo charger of the first embodiment, wherein a temperature-sensing member is provided in said actuator, and said temperature-sensing member limits the operation of said actuator, so that the opening degree of the nozzle vanes is limited to stay greater than a predetermined opening degree within a predetermined period of time from the cold starting of the engine due to the amount of displacement of said temperature-sensing member which is in a low-temperature state.

According to a third aspect of the present invention, there is provided a variable-nozzle type turbo charger equipped with a plurality of nozzle vanes of which the opening degree can be changed and are capable of changing the areas of turbine nozzles at the time when exhaust gases of an engine are guided from said turbine nozzles formed among said nozzle vanes to a turbine rotor, and in which a by-pass and a waste gate valve are provided so that part of the exhaust gases detour the turbine, comprising:

an actuator for adjusting the opening degree of said nozzle vanes;

a first control means for opening said waste gate valve for a predetermined period of time from the start of the engine; and a second control means for so controlling said actuator that the areas of said turbine nozzles become the minimum area to promote the warming-up of the engine when the water temperature of the engine or the engine load is smaller than a predetermined value after the passage of said predetermined period of time.

In the thus constituted variable-nozzle type turbo charger according to the first embodiment of the present invention, the actuator is so controlled by the first control means that the areas of the turbine nozzles become larger than a minimum area for a predetermined period of time at the start of the engine. Therefore, the exhaust gases are allowed to be easily exhausted, the pressure of the exhaust gases become low and, accordingly, the air is sufficiently intaken into the combustion chamber, contributing to improving the starting performance of the engine. In the variable-nozzle type turbo charger according to the second aspect of the present invention, the first control means is easily realized by using a temperature-sensing member such as a bimetal strip or the like. In the variable-nozzle type turbo charger according to the third aspect of the present invention, the same effect is easily obtained by controlling the waste gate valve which is provided for decreasing the supercharging pressure without the need of particularly adjusting the opening degree of the nozzle vanes.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figure 1:
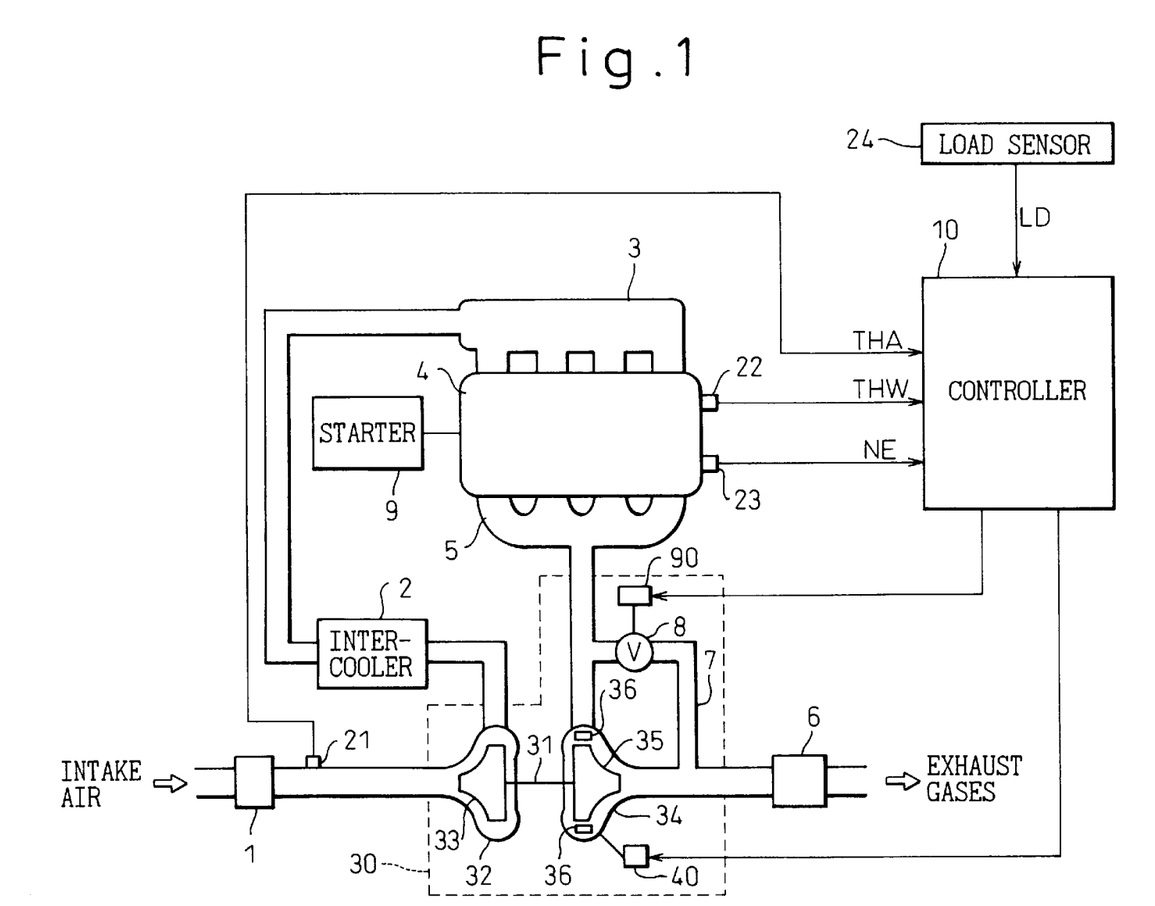
FIG. 1 is a diagram schematically illustrating an engine to which is adapted a variable-nozzle type turbo charger according to embodiments of the present invention.

FIG. 1 is a diagram schematically illustrating an engine to which is adapted a variable-nozzle type turbo charger 30 according to an embodiment of the present invention. The air necessary for the combustion in the engine is cleaned through an air cleaner 1, compressed by a compressor 32 in the turbo charger 30, cooled through an inter-cooler 2, and is distributed to the cylinders of an engine body 4 through an intake manifold 3. The exhaust gases produced in the cylinders are collected in an exhaust manifold 5, passed through a turbine 34 in the turbo charger 30, and are finally purified through a catalytic converter 6 and are exhausted. In order to prevent excessive supercharging effect by the turbo charger 30, provision is made of an exhaust gas by-pass 7 and a waste gate valve (WGV) 8 which permit exhaust gases to bypass the turbine 34. The waste gate valve 8 is opened and closed by an actuator 90 for WGV. A starter motor 9 is used for starting the engine, i.e., for cranking the engine.

In the turbine 34 of the turbo charger 30, a turbine rotor (often called a turbine wheel or turbine blades) 35 is rotated by the exhaust gases. Compressor blades 33 of the compressor 32 are connected to the turbine rotor 35 by a shaft 31, and rotate together with the turbine rotor 35 to compress the intaken air, i.e., to produce the supercharging action. As will be described later in detail, the turbine 34 is provided with a plurality of nozzle vanes (NV) 36 of which the opening degree can be varied, so that the areas of the turbine nozzles formed among the nozzle vanes can be changed. The opening degree of the nozzle vanes 36 is adjusted by an actuator 40 for the NV.

A controller 10 receives signals from an intake air temperature sensor 21, an engine coolant temperature sensor 22, an engine rotational speed sensor 23 and an engine load sensor 24, and detects an intake air temperature THA, a water temperature THW, an engine rotational speed NE and an engine load LD based upon these signals. Based upon these detected data, the controller 10 controls the actuator 40 for the NV and the actuator 60 for the WGV.

As described above, the present invention is to provide a variable-nozzle type turbo charger equipped with a control means capable of enhancing the starting performance of the engine. For this purpose according to the present invention, a constitution is employed to temporarily decrease the back pressure of the engine at the start of the engine. Means for temporarily decreasing the back pressure of the engine will now be described in detail by way of six embodiments.

Figure 2:
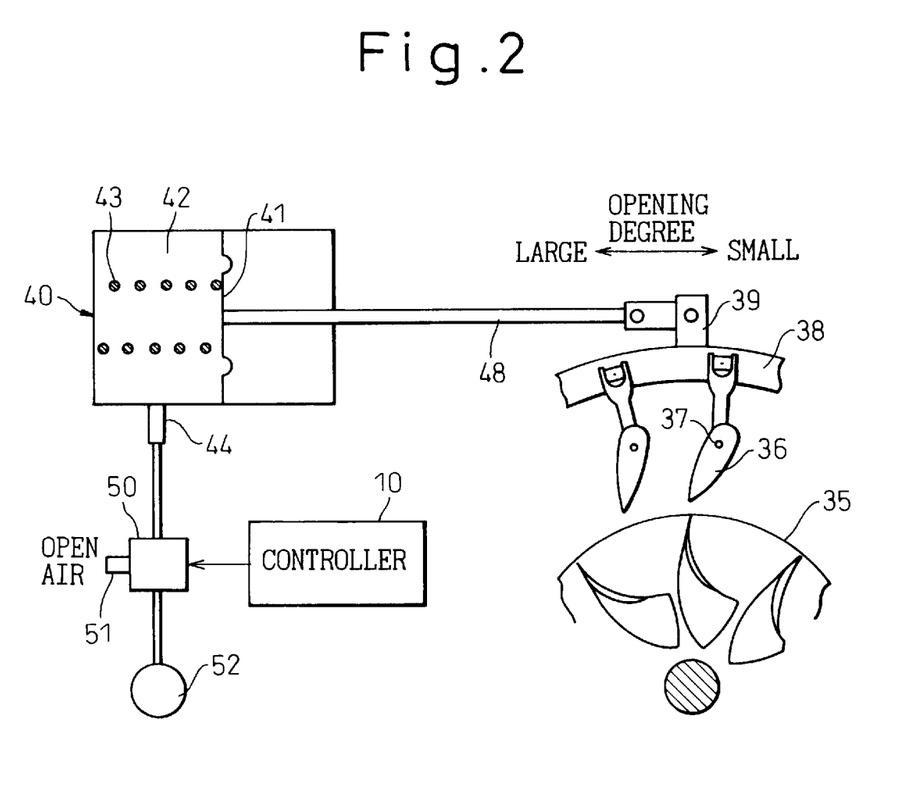
FIG. 2 is a diagram illustrating a variable-nozzle type turbo charger according to a first embodiment of the present invention, and shows a portion related to controlling the opening degree of the nozzle vanes.

FIG. 2 is a diagram illustrating the variable-nozzle type turbo charger 30 according to a first embodiment, and shows a portion related to controlling the opening degree of the nozzle vanes 36. A plurality of variable-nozzle vanes 36 of which the opening degree can be changed are provided in the gas passage in the turbine inlet for guiding the exhaust gases to the turbine rotor 35. The opening degree of the nozzle vanes 36 is adjusted by turning a drive ring 38 via a link 39 which is coupled to a rod 48 of the actuator 40 for the NV.

In FIG. 2, when the rod 48 is actuated toward the left, the nozzle vanes 36 turn in the counterclockwise direction with the pins 37 as centers, resulting in an increase in the opening degree and an increase in the areas of the turbine nozzles formed between the nozzle vanes. When the rod 48 is actuated toward the right, on the other hand, the nozzle vanes 36 turn in the clockwise direction with the pins 37 as centers, resulting in a decrease in the opening degree and a decrease in the areas of the turbine nozzles formed between the nozzle vanes.

In the actuator 40 is formed a diaphragm chamber 42 partitioned by a diaphragm 41. The rod 48 is connected to the diaphragm 41. Furthermore, the diaphragm 41 is urged by a spring 43 toward a direction to close the nozzle vanes 36.

An inlet port 44 of the diaphragm chamber 42 is connected to a vacuum regulating valve (hereinafter referred to as VRV) 50 which is connected to a vacuum pump 52 that is a source of negative pressure. The VRV 50 is further connected to the controller 10. In response to a signal from the controller 10, the VRV 50 adjusts the pressure by using a negative pressure from the vacuum pump 52 and the atmospheric pressure through an open air port 51, and introduces the pressure into the diaphragm chamber 42. In this embodiment, the opening degree of the nozzle vanes becomes a minimum when the atmospheric pressure is introduced into the diaphragm chamber 42 and, as a result, the areas of the turbine nozzles become the smallest among the nozzle vanes. In other words, the variable nozzles of this embodiment are of the normally closed type.

As described above, to the controller 10 are connected the intake air temperature sensor 21, engine coolant temperature sensor 22, engine rotational speed sensor 23, and engine load sensor 24. Based upon these signals, the controller 10 controls the opening degree of the nozzle vanes 36, i.e., controls the areas of the turbine nozzles. The control operation will now be described with reference to time charts of FIGS. 3A, 3B and 3C.

Figure 3A:
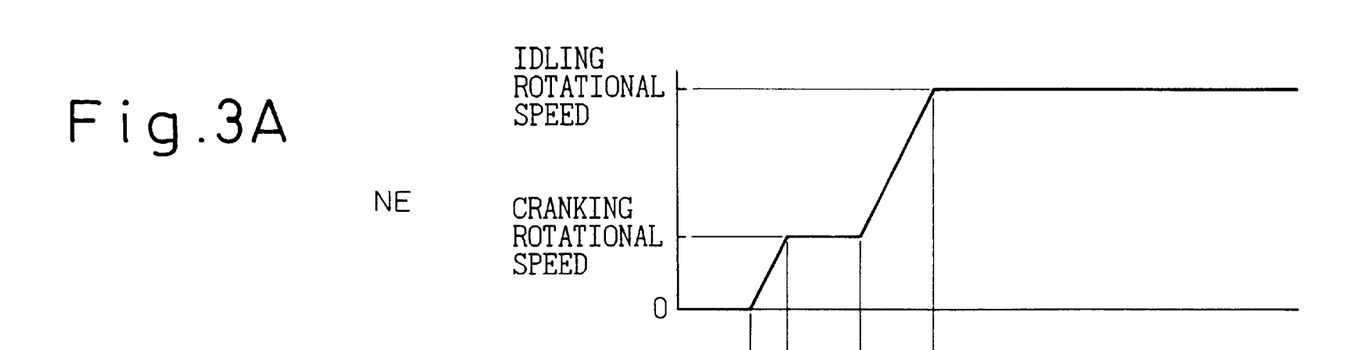
FIGS. 3A, 3B and 3C are time charts for explaining the control operation according to the first embodiment.
Figure 3B:
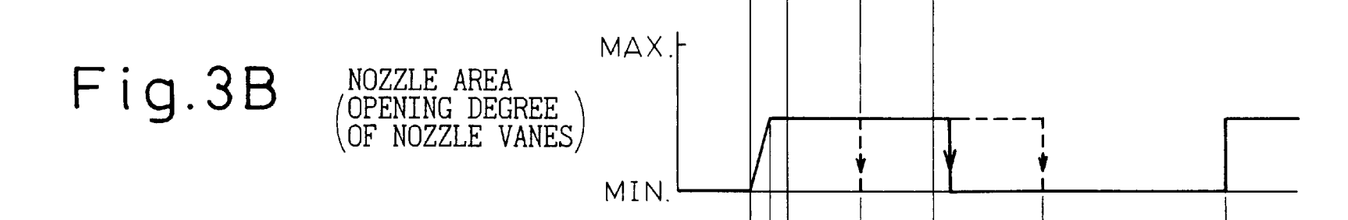
Figure 3C:
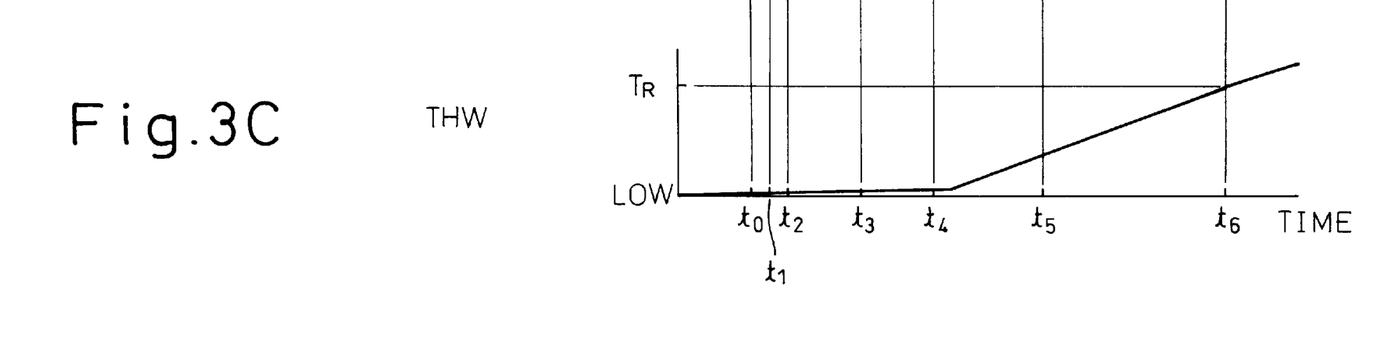

Referring to FIGS. 3A, 3B and 3C, before a time $t_0$, i.e., when the engine is at rest, the engine rotational speed NE is 0, the turbine nozzle area AREA is a minimum (since the device is of the normally closed type), and the engine coolant temperature THW is low. At the moment $t_0$, when the ignition switch is turned on to start the engine, i.e., when the cranking is started by a starter motor 9, the engine rotational speed NE increases and reaches a cranking rotational speed at a moment $t_2$.

At the moment $t_0$, the controller 10 so controls, via the VRV 50, the actuator 40 for NV that the turbine nozzle area AREA assumes a predetermined area for starting which is larger than the minimum value. Therefore, the turbine nozzle area AREA increases with an increase in the negative pressure of the vacuum pump 52 and reaches, at a moment $t_1$, the opening degree for starting. Being controlled as described above, the exhaust gases easily pass through the turbine, whereby the pressure of the exhaust gases (back pressure of the engine) decreases and, as a result, the air is sufficiently intaken into the combustion chamber contributing to improving the starting performance of the engine.

At a moment $t_3$, the engine starts revolving by itself, and the engine rotational speed NE exceeds the cranking rotational speed and reaches the idling rotational speed at a moment $t_4$. The controller 10 confirms that the water temperature THW is low at any moment from the moment $t_3$ to a moment $t_5$ (the moment after the passage of a predetermined period of time from the moment $t_4$), and minimizes the turbine nozzle area AREA in order to promote the warming-up of the engine. This may be done relying upon the intake air temperature THA or the engine load LD instead of the engine coolant temperature THW. At this moment, the engine rotational speed NE is increasing and the pressure of the exhaust gases has been elevated. Therefore, even if an instruction signal is sent to the actuator for NV for minimizing the opening degree of the nozzle vanes, the nozzle vanes 36 are opened to some extent and the engine does not stall. Upon minimizing the turbine nozzle area AREA as described above, the pumping work of the engine increases and, as a result, the engine is quickly warmed up.

Then, at a moment $t_6$ when the coolant temperature THW has increased to reach a predetermined reference value $T_R$, the controller 10 so determines that the engine has been warmed up, and starts controlling the turbine nozzle area AREA, i.e., starts controlling the opening degree of the nozzle vanes depending upon the engine load LD and the engine rotational speed NE.

Figure 4:
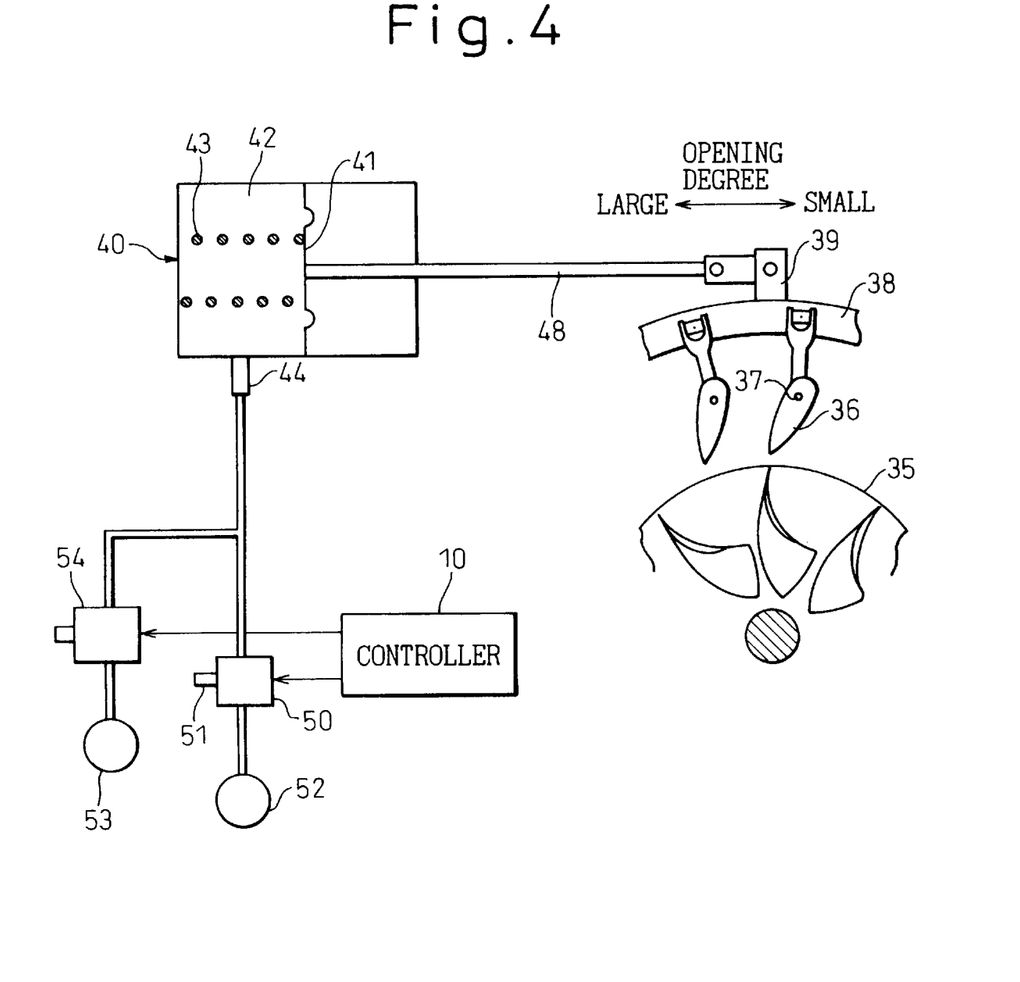
FIG. 4 is a diagram illustrating a variable-nozzle type turbo charger according to a second embodiment of the present invention, and shows a portion related to controlling the opening degree of the nozzle vanes.
Figure 5A:
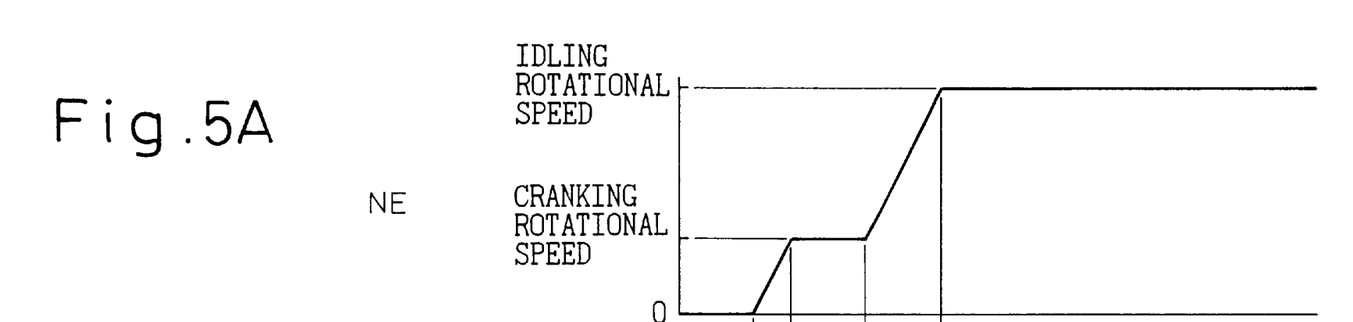
FIGS. 5A, 5B and 5C are time charts for explaining the control operation according to a second embodiment.
Figures 5B, 5C:
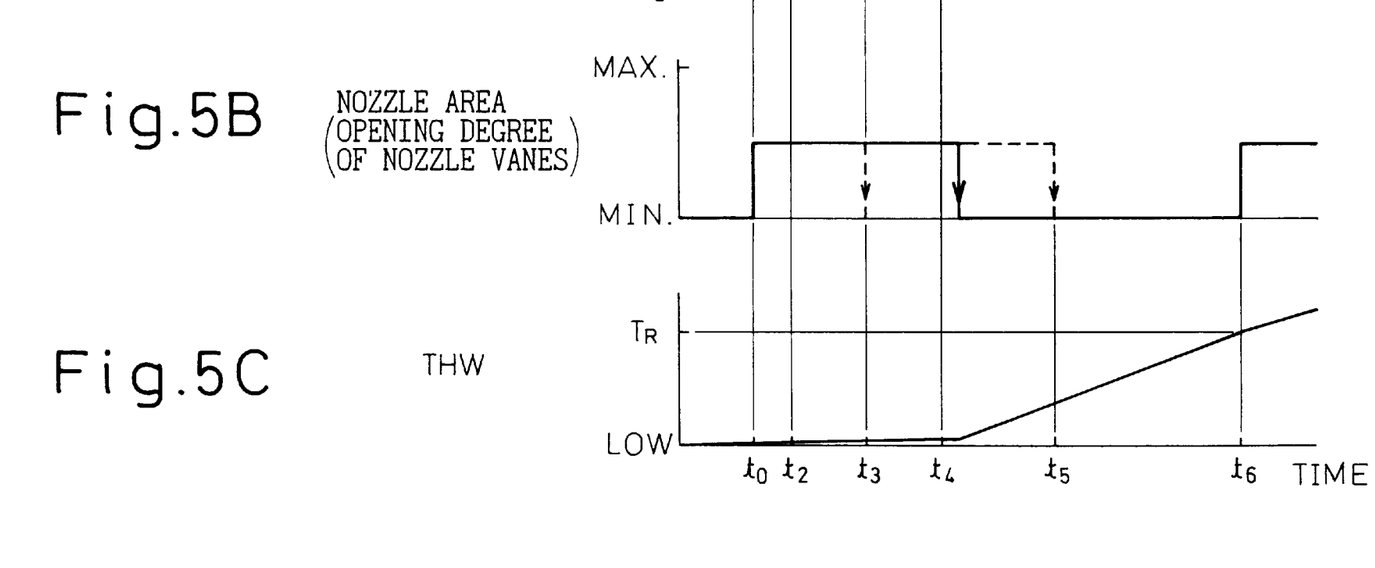

FIG. 4 is a diagram of the variable-nozzle type turbo charger 30 according to a second embodiment, and shows a portion related to controlling the opening degree of the nozzle vanes 36, and FIGS. 5A, 5B and 5C are time charts for control operation according to the second embodiment. Described below are only the differences from the first embodiment. In the second embodiment, in addition to the vacuum pump 52, a separate negative-pressure tank 53 is connected, via a vacuum switching valve (hereinafter referred to as VSV) 54, to the inlet port 44 of the diaphragm chamber 42 of the actuator 40 for NV. Therefore, a negative pressure is supplied simultaneously with the start of the engine, and, as shown in FIG. 5B, the turbine nozzle area AREA readily reaches the area for starting at the moment $t_0$.

Figure 6:
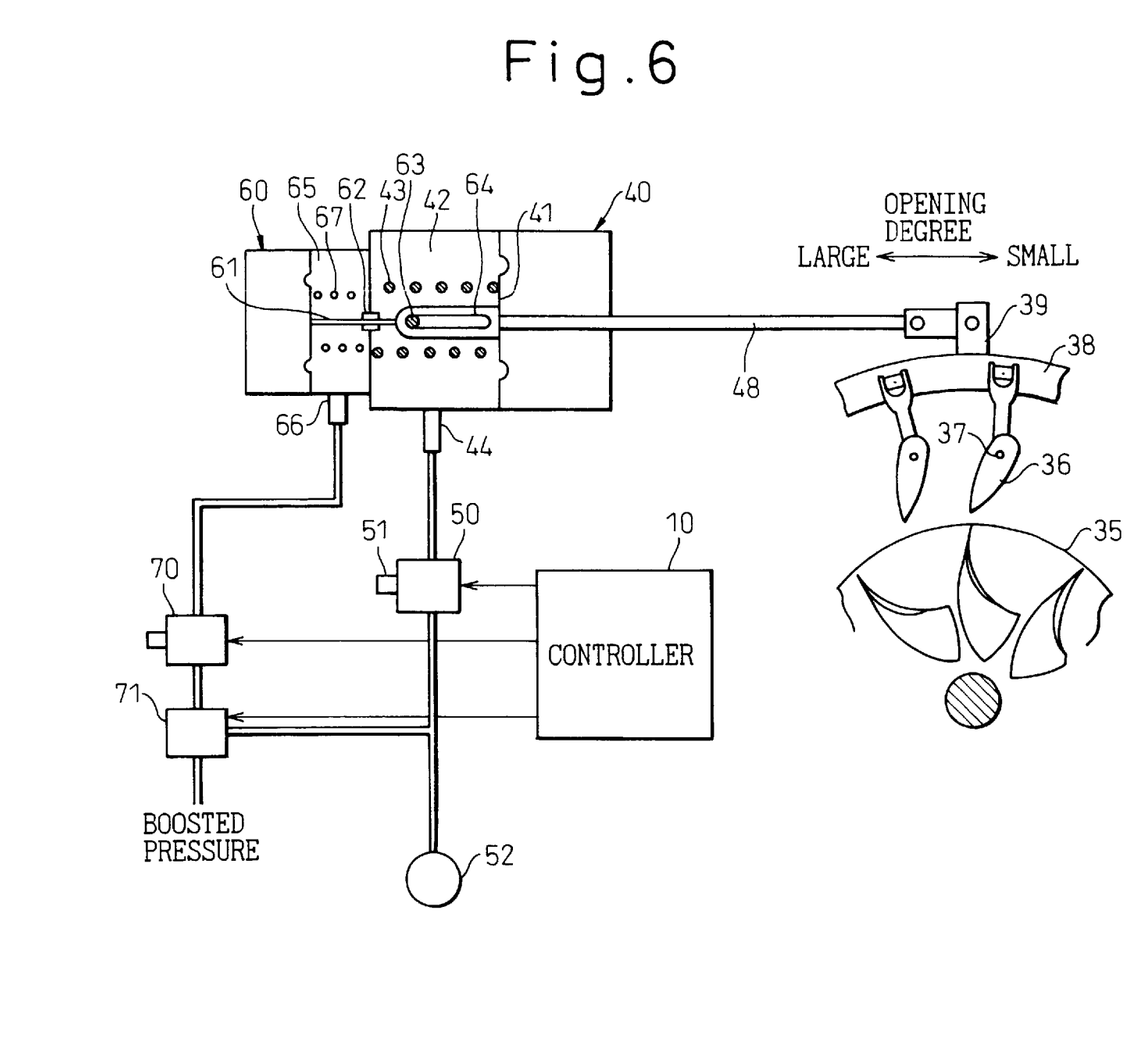
FIG. 6 is a diagram illustrating a variable-nozzle type turbo charger according to a third embodiment of the present invention, and shows a portion related to controlling the opening degree of the nozzle vanes.

FIG. 6 is a diagram illustrating the variable-nozzle type turbo charger 30 according to a third embodiment, and shows a portion related to controlling the opening degree of the nozzle vanes 36. According to the third embodiment, an actuator 60 for assisting warming-up is attached to the actuator 40 for NV in tandem. A rod 61 for assisting warming-up of the actuator 60 for assisting warming-up protrudes into the actuator 40 for NV and is sealed by a pressure seal 62. A pin 63 at the end of the rod 61 for assisting the warming-up is inserted in a guide 64 coupled to the diaphragm 41 of the actuator 40 for NV.

Figure 7A:
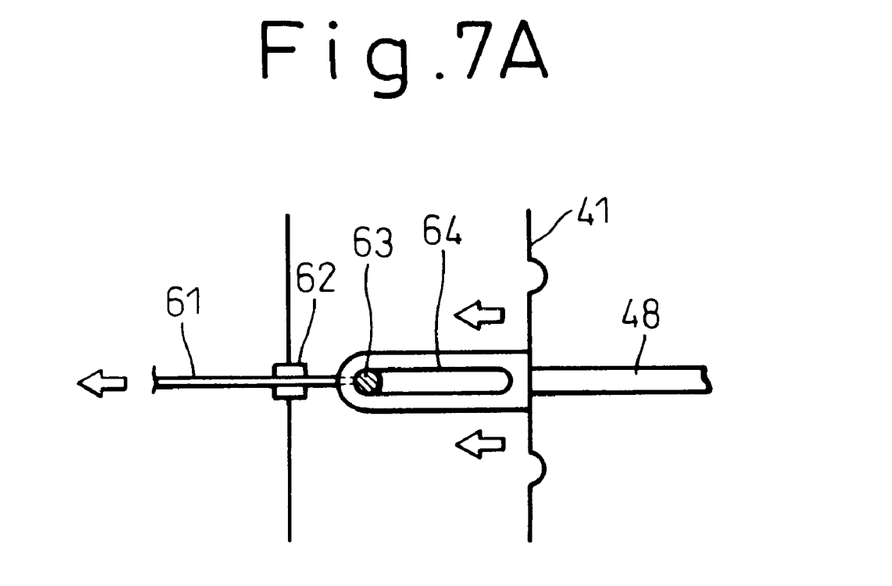
FIGS. 7A and 7B are diagrams for explaining the operation of an actuator for assisting the warming-up.
Figure 7B:
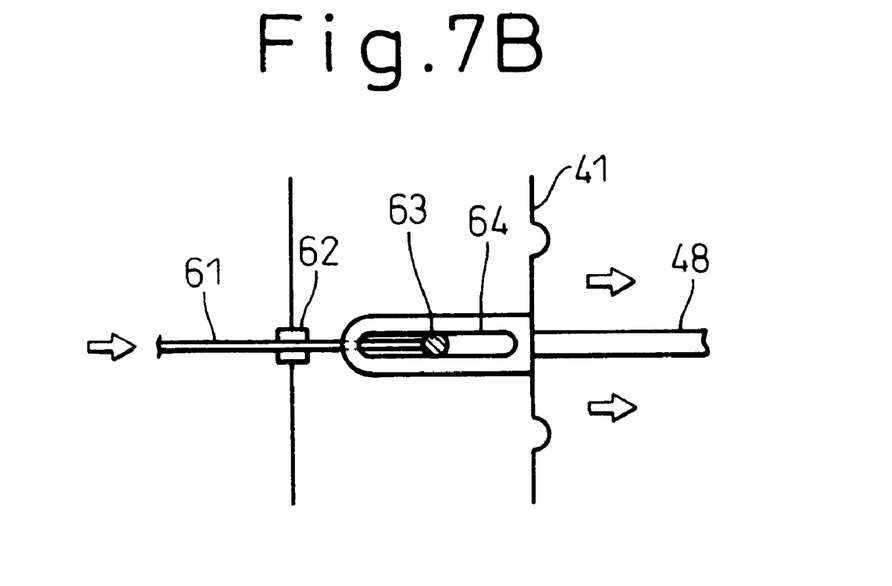
Figure 8A:
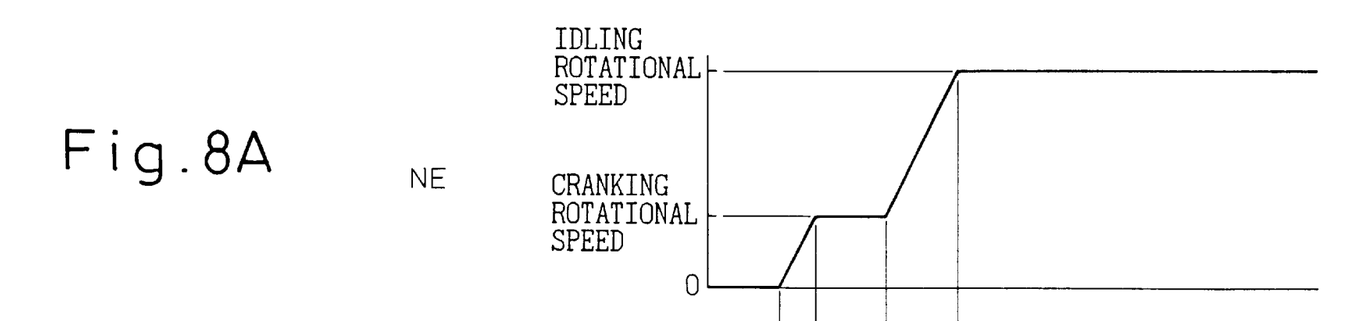
FIGS. 8A, 8B, 8C and 8D are time charts for explaining the control operation according to the third embodiment.
Figure 8B:
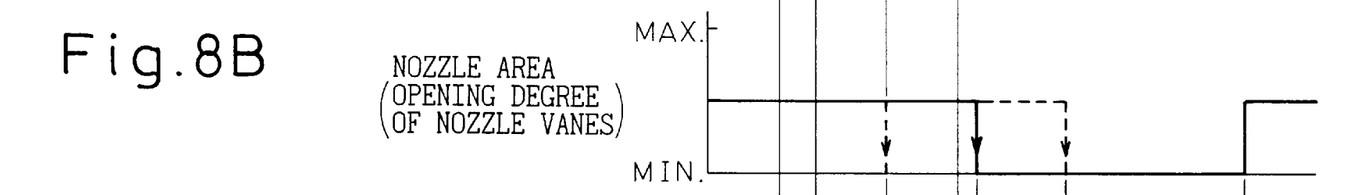
Figure 8C:
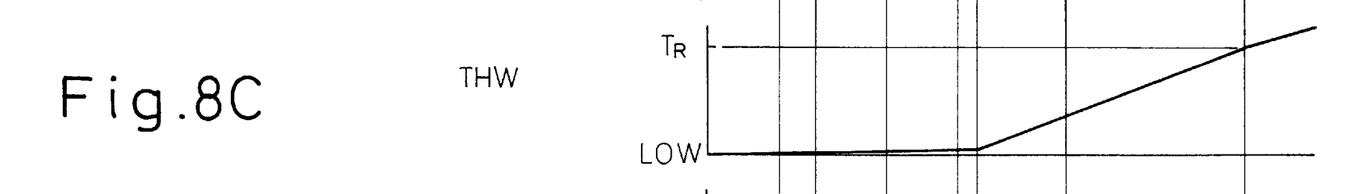
Figure 8D:
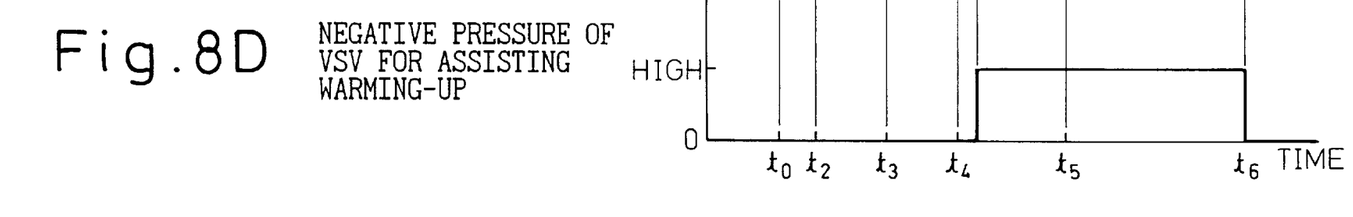

A VSV 70 for assisting the warming-up is connected to an inlet port 66 of a diaphragm chamber 65 of the actuator 60 for assisting warming-up, and is further connected to another VSV 71 which is connected to the vacuum pump 52 and to a boosted pressure (supercharged intake pressure). Before the engine is started as shown in FIG. 7A, no negative pressure is supplied from the VSV 70 for assisting warming-up; i.e., the rod 61 for assisting warming-up is leftwardly urged by a spring 67 of the actuator 60 for assisting warming-up and, hence, the diaphragm 41 of the actuator 40 for NV is leftwardly urged, so that the nozzle vanes are opened to some extent as shown in FIG. 8B. This makes it possible to decrease the back pressure of the engine at the time of starting. During the warming-up as shown in FIG. 8D, a negative pressure is supplied from the VSV 70 for assisting warming-up to the actuator 60 for assisting warming-up, and the moving range of the actuator 40 for NV is widened as shown in FIG. 7B to minimize the opening degree of the nozzle vanes, i.e., to minimize the turbine nozzle areas. In this embodiment, in order to prevent the situation in which the opening degree of the nozzle vanes is fixed to a minimum value in case the actuator for NV becomes defective (due to breakage in the diaphragm), the boosted pressure can be applied to the diaphragm chamber 65.

Figure 9:
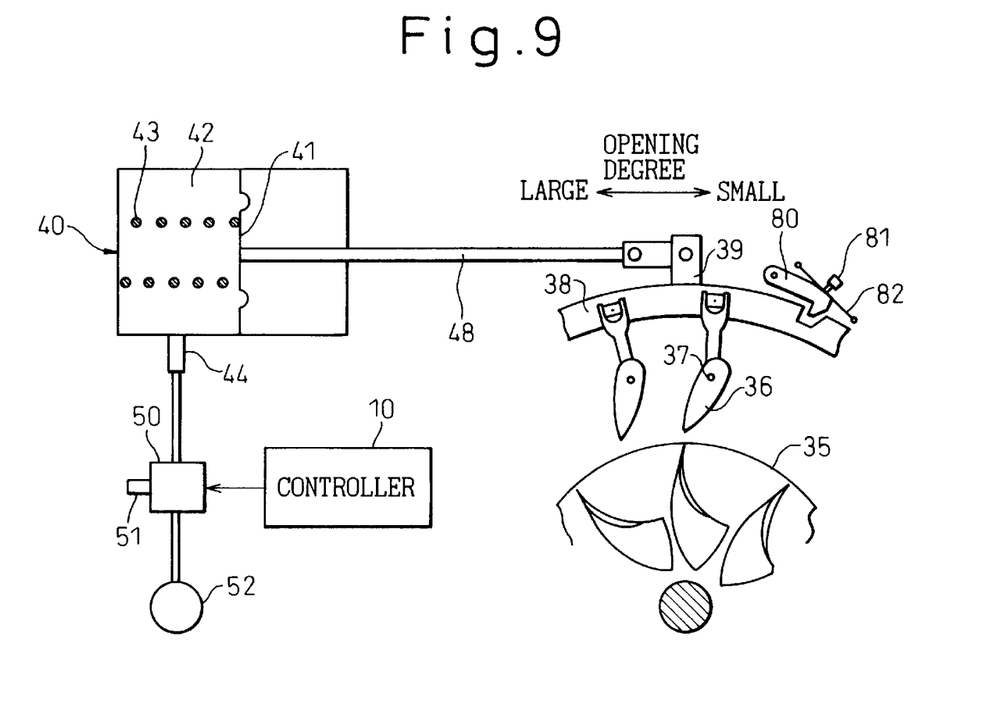
FIG. 9 is a diagram illustrating a variable-nozzle type turbo charger according to a fourth embodiment of the present invention, and shows a portion related to controlling the opening degree of the nozzle vanes.
Figure 10A:
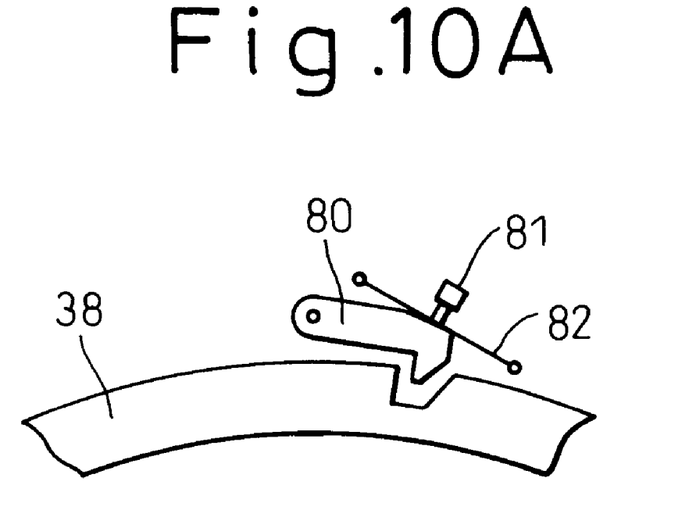
FIGS. 10A and 10B are diagrams for illustrating the operation of a stopper.
Figure 10B:
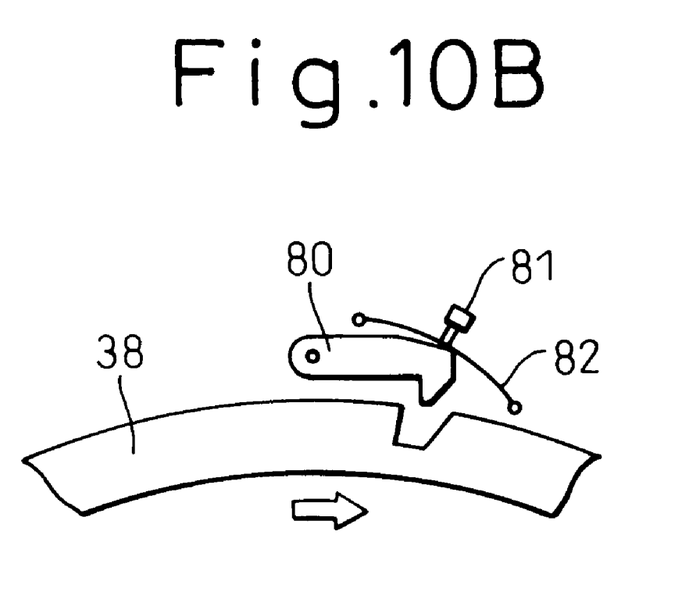

FIG. 9 is a diagram illustrating the variable-nozzle type turbo charger 30 according to a fourth embodiment, and shows a portion related to controlling the opening degree of the nozzle vanes 36. According to the fourth embodiment as shown, a stopper 80 works upon the drive ring 38. A bimetal strip 82 is fastened by a pin 81 to the stopper 80. The bimetal strip 82 is secured at its both ends to the turbine housing (not shown). When cold as shown in FIG. 10A, the stopper 80 moves into the drive ring 38, so that the opening degree of the nozzle vanes is maintained to be not smaller than a predetermined value. Therefore, the turbine nozzles are opened to some extent, the back pressure of the engine is prevented from rising, and the starting performance is improved. Next, after the engine has started and after the temperature of the turbine housing is elevated to some extent as shown in FIG. 10B, the bimetal strip 82 bends and the stopper 80 is disengaged. In order to promote the warming-up, therefore, the opening degree of the nozzle vanes is minimized, i.e., the turbine nozzle areas are minimized.

Figure 11:
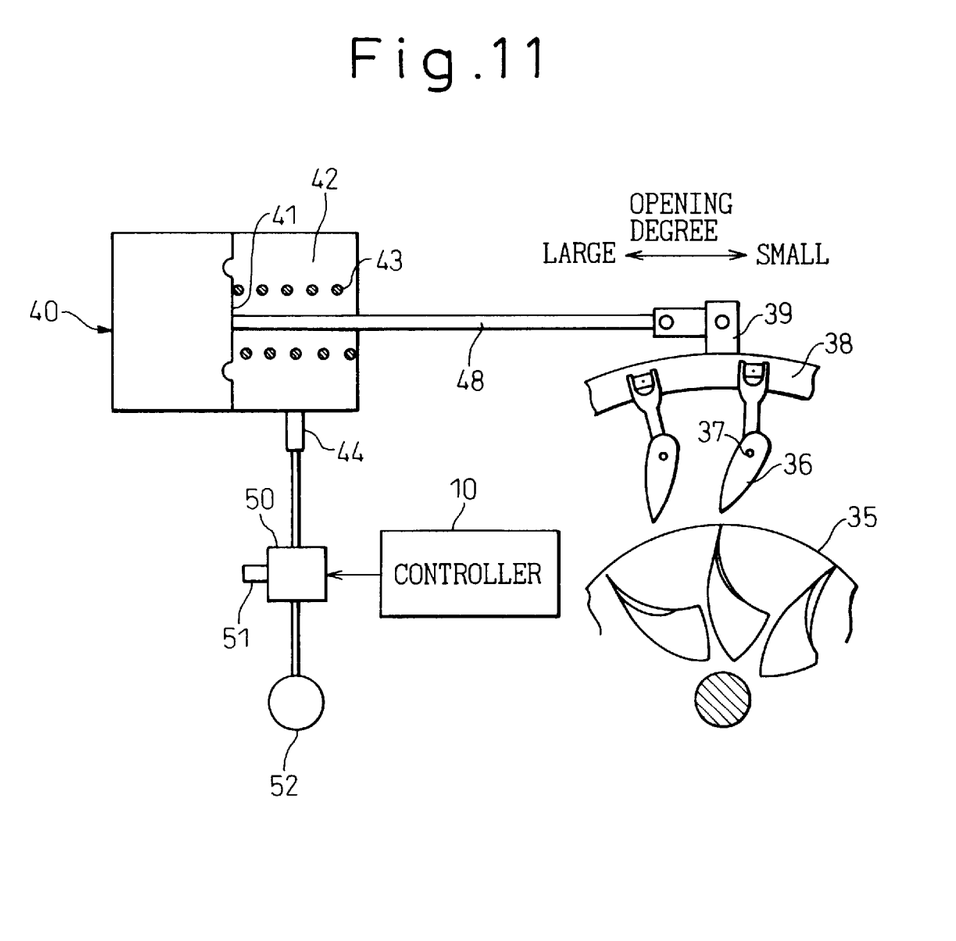
FIG. 11 is a diagram illustrating a variable-nozzle type turbo charger according to a fifth embodiment of the present invention, and shows a portion related to controlling the opening degree of the nozzle vanes.
Figures 12A, 12B:
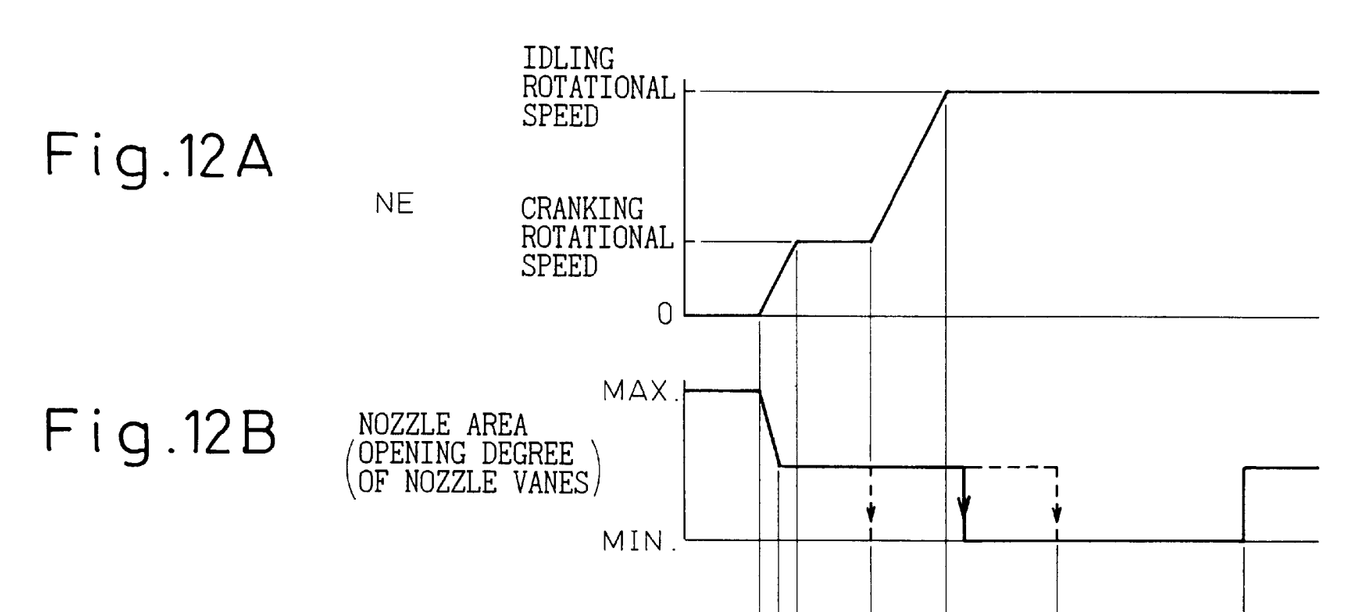
FIGS. 12A, 12B and 12C are time charts for explaining the control operation according to the fifth embodiment.
Figure 12C:
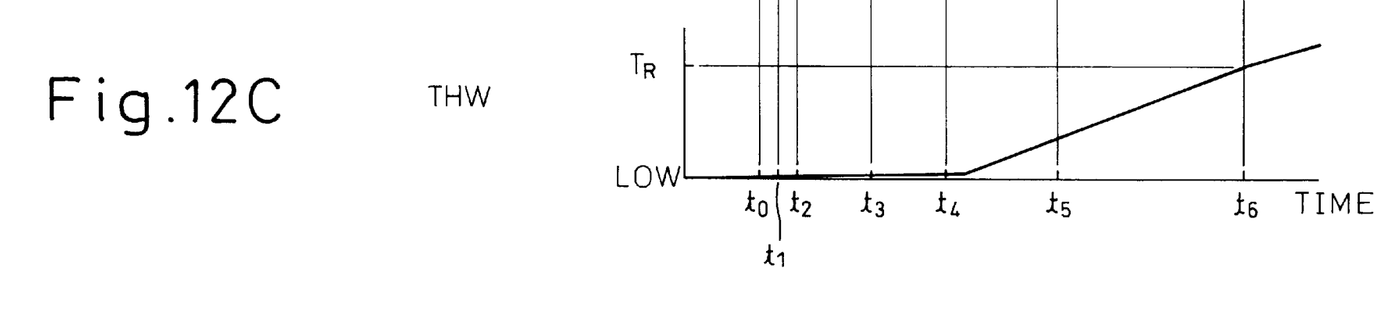

FIG. 11 is a diagram illustrating the variable-nozzle type turbo charger 30 according to a fifth embodiment, and shows a portion related to controlling the opening degree of the nozzle vanes 36. In the fifth embodiment, the diaphragm chamber 42 and the spring 43 are arranged on the right side in the drawing. That is, the variable nozzle-type turbo charger is of the normally open type and its control operation is different from that of the first embodiment only with respect to that the turbine nozzle area AREA is a maximum at first as shown in the time charts of FIGS. 12A, 12B and 12C.

Figure 13:
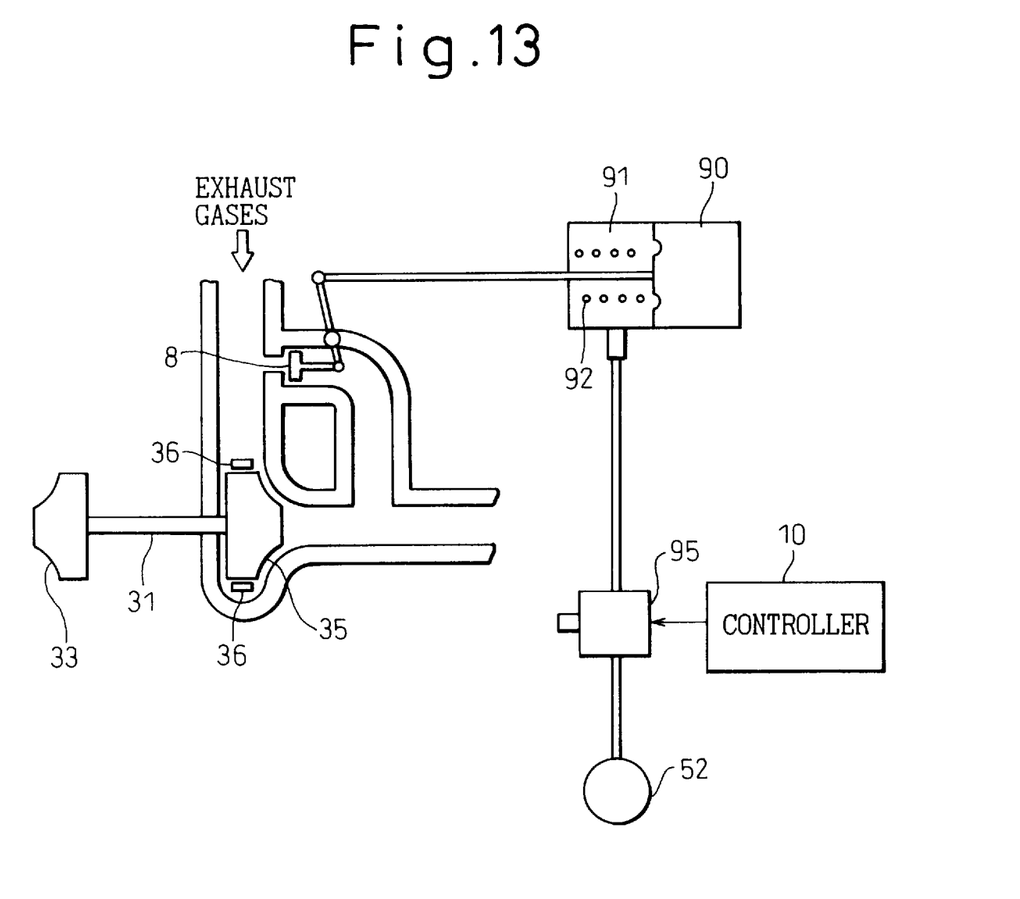
FIG. 13 is a diagram illustrating a variable-nozzle type turbo charger according to a sixth embodiment of the present invention, and shows a portion related to controlling the opening degree of a waste gate valve.
Figure 14A:
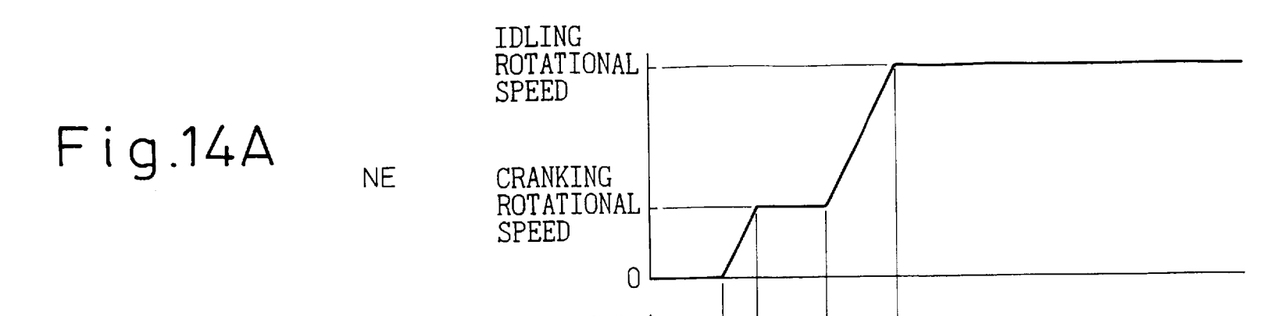
FIGS. 14A, 14B, 14C and 14D are time charts for explaining the control operation according to the sixth embodiment.
Figure 14B:
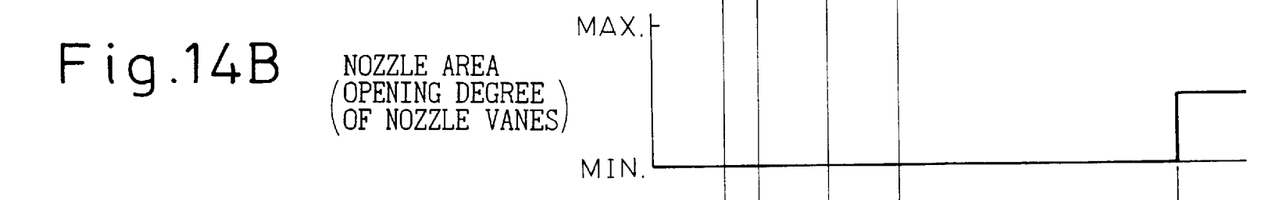
Figure 14C:
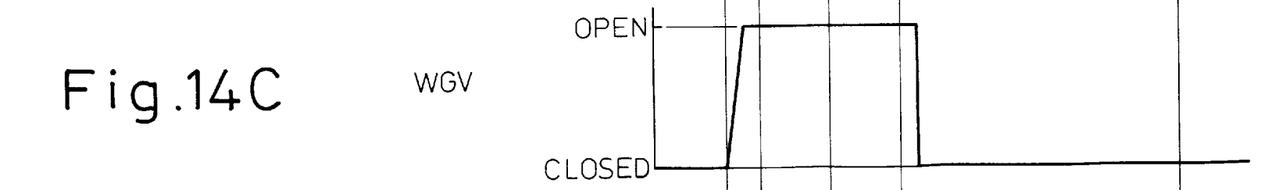
Figure 14D:
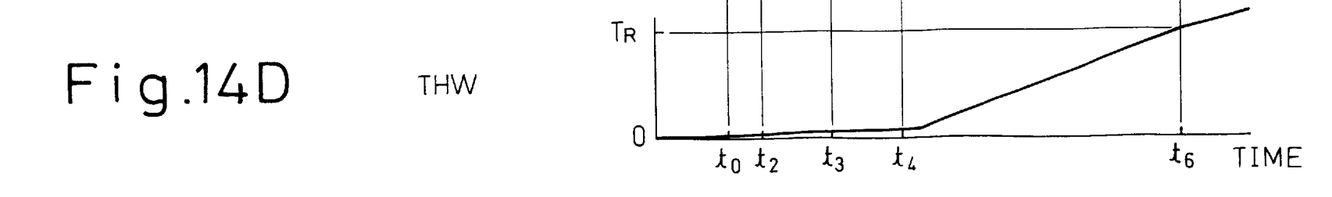

FIG. 13 is a diagram illustrating the variable-nozzle type turbo charger 30 according to a sixth embodiment, and shows a portion related to controlling the opening degree of the waste gate valve 8. In the first to fifth embodiments, the turbine nozzle area is set to be a value for starting which is larger than the minimum area, in order to decrease the back pressure of the engine and to improve the starting performance. In the sixth embodiment, on the other hand, the exhaust gases are permitted to partly bypass the turbine, in order to decrease the back pressure of the engine.

Referring to FIG. 13, an actuator 90 for WGV for driving the waste gate valve 8 is provided with a negative-pressure chamber 91 to which a vacuum pump 52 is connected via a VSV 95. The waste gate valve 8 is usually closed by the force of a spring 92, but is opened upon introducing a negative pressure into the negative-pressure chamber 91 to release the exhaust gases. According to this embodiment as shown in the time charts of FIGS. 14A, 14B, 14C and 14D, the waste gate valve 8 is opened immediately after the start of the engine until the engine rotates by itself, to obtain effects the same as those of the embodiments described in the foregoing.

According to the present invention as described above, there is provided a variable-nozzle type turbo charger equipped with means for temporarily decreasing the back pressure of the engine at the time of starting the engine, in order to further improve the starting performance of the engine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A variable-nozzle type turbo charger equipped with a plurality of nozzle vanes of which the opening degree can be changed and are capable of changing the areas of turbine nozzles at the time when exhaust gases of an engine are guided from said turbine nozzles formed among said nozzle vanes to a turbine rotor, comprising:

an actuator for adjusting the opening degree of said nozzle vanes, the opening degree of said nozzle vanes being at one of a minimum position and a maximum position when the engine is in an off condition;

a first control means for so controlling said actuator that the areas of the turbine nozzles are larger than a minimum area for a predetermined period of time from the start of the engine; and a second control means for so controlling said actuator that the areas of said turbine nozzles become the minimum area to promote the warming-up of the engine when one of a water temperature of the engine and an engine load is smaller than an appropriate predetermined value after the passage of said predetermined period of time.

2. A variable-nozzle type turbo charger according to claim 1, wherein a temperature-sensing member is provided in said actuator, and said temperature-sensing member limits the operation of said actuator, so that the opening degree of the nozzle vanes is limited to stay greater than a predetermined opening degree within the predetermined period of time from the cold starting of the engine due to the amount of displacement of said temperature-sensing member which is in a low-temperature state.

3. A variable-nozzle type turbo charger equipped with a plurality of nozzle vanes of which the opening degree can be changed and are capable of changing the areas of turbine nozzles at the time when exhaust gases of an engine are guided from said turbine nozzles formed among said nozzle vanes to a turbine rotor, and in which a by-pass and a waste gate valve are provided so that part of the exhaust gases detour the turbine, comprising:

an actuator for adjusting the opening degree of said nozzle vanes;

a first control means for opening said waste gate valve for a predetermined period of time from the start of the engine; and a second control means for so controlling said actuator that the areas of said turbine nozzles become the minimum area to promote the warming-up of the engine when one of a water temperature of the engine and an engine load is smaller than an appropriate predetermined value after the passage of said predetermined period of time.

4. A variable-nozzle type turbocharger, comprising:

adjusting means for adjusting a flow of exhaust gases from an engine to a turbine rotor;

an actuator for adjusting an opening degree of said adjusting means;

a first control means for controlling said actuator to open the adjusting means so that a back pressure of said engine is reduced for a first predetermined period of time from a beginning of a start of said engine; and a second control means for controlling said actuator so that areas of said adjusting means become a minimum area to promote warming-up of the engine when one of a water temperature of the engine and an engine load is smaller than a predetermined value after passage of the first predetermined period of time.

5. The variable-nozzle type turbocharger according to claim 4, wherein said adjusting means is a plurality of nozzle vanes.

6. The variable-nozzle type turbocharger according to claim 4, wherein said adjusting means is a turbine bypass and a waste gate valve in said turbine bypass.

7. The variable-nozzle type turbocharger according to claim 5, wherein a temperature-sensing member is provided in said actuator, and said temperature-sensing member limits the operation of said actuator so that the opening degree of the nozzle vanes is limited to stay greater than a predetermined opening degree within a second predetermined period of time from the start of the engine due to an amount of displacement of said temperature-sensing member which is in a low-temperature state.

* * * * *